3,480,685
OCTATRIENE PROCESS
Julian Feldman, Bernard A. Saffer, and Orville D. Frampton, Cincinnati, Ohio, assignors to National Distillers and Chemical Corporation, New York, N.Y., a corporation of Virginia
No Drawing. Continuation-in-part of application Ser. No. 248,518, Dec. 31, 1962. This application Mar. 20, 1963, Ser. No. 266,514
Int. Cl. C07c 11/00, 11/12, 3/20
U.S. Cl. 260—677                     23 Claims This invention relates to methods of preparing linear dimers from open chain conjugated diolefinic compounds. More particularly, this invention relates to the preparation of 1,3,6-octatriene in commercial yields from 1,3-butadiene. This invention also relates to the recovery of 2,6-octadiene and 2,4,6-octatriene as by-products in the production of 1,3,6-octatriene.

The prior art shows the production of cycloolefins from conjugated open chain diolefinic compounds using certain zerovalent nickel compounds as catalysts. The catalysts usable are derivatives of nickel carbonyl bearing in lieu of at least one of its carbonyl groups a compound of trivalent nitrogen, phosphorus, or antimony as described by Reed in United States Patents 2,686,208 and 2,686,209, or later modifications thereof.

This invention is a continuation-in-part of copending application, Ser. No. 248,518; filed December 31, 1962, now Patent No. 3,284,529, issued Dec. 31, 1962.

It is an object of this invention to prepare linear dimers from open chain conjugated diolefinic compounds. Another object is to provide a catalytic process for the commercial preparation of 1,3,6-octatriene from 1,3-butadiene. Still another object is to provide a process for the recovery of 2,6-octadiene and 2,4,6-octatriene as by-products in the production of 1,3,6-octatriene. Other objects will appear hereinafter.

It has been discovered that in the production of cycloolefins from conjugated open chain diolefinic compounds using zerovalent nickel compounds as catalyst, when certain alcoholic compounds are added to the reactants, the catalyst system is modified so as to give a new synthesis in which the alcohol acts as a co-catalyst for the type of dimerizations which involve hydrogen transfer. In this catalyst system, the alcohol participates in the reaction to give new products. In the polymerization of 1,3-butadiene, for example, the course of the reaction is altered so as to give the linear dimer 1,3,6-octatriene as the major product along with minor amounts of 2,4,6-octatriene, as well as significant amount of 2,6-octadiene, which presumably results from the reduction of 1,3,6-octadiene by the alcohol. Some cyclic products are also formed. The linear dimers can be recovered from the reaction mixture by distillation and thermal diffusion processes.

The 1,3,6-octatriene formed in this process is a new composition which differs from the 1,3,6-octatriene described in copending application, Ser. No. 248,518. This difference is believed to be a difference in the cis or trans configuration in the 3 and 6 unsaturation.

These linear octatrienes are useful in forming polymers and as a raw material for chemical synthesis.

The conjugated diolefins especially suitable as starting materials for our invention have from about four to eight carbon atoms per molecule. The preferred diolefin is 1,3-butadiene; other conjugated open chain diolefins, particularly 1,3-diolefins, are useful, including 2-methyl-1,3-butadiene (isoprene); 2,3-dimethyl-1,3-butadiene; 2-chloro-1,3-butadiene (chloroprene); 2,3-dichloro-1,3-butadiene; 1,3-pentadiene (piperylene); phenyl diolefins; and 2,4-hexadiene; mixed halogen derivatives may be used, including chloro-fluoro-1,3-butadienes.

The nickel catalysts used as one component of the catalyst system of our invention are the zerovalent nickel catalysts derived from nickel carbonyl. These catalysts include compounds which are known to form cyclic dimers from the above described conjugated open chain diolefins, and have the formula:

$$((RO)_3P)_n \, Ni(CO)_{4-n}$$
$$(R_3P)_n \, Ni(CO)_{4-n}$$
$$(R_3Sb)_n Ni(CO)_{4-n}$$
$$(R_3As)_n Ni(CO)_{4-n}$$

where R is an alkyl, aryl or heterocyclic radical, and $n$ has a value of one or two. The preferred nickel catalysts for the process of our invention have the formula: $(X_3P)_2Ni(CO)_2$ where X is $C_6H_5$ or $C_6H_5O$, and are known by the names bis(triphenylphosphine)nickel dicarbonyl and bis(triphenylphosphite)nickel dicarbonyl respectively.

The above described synthesis has also been demonstrated with catalysts having the following formula: $A_{1,2}$-Ni-$B_2$ where A is triphenyl phosphine, tripenyl phosphite, or "phos," which is 1-methyl-4-phospa-3,5,8-trioxabicyclo [2,2,2]octane and has the formula:

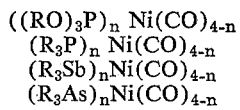

and where B is cinnamonitrile, acrylonitrile, fumaronitrile or acrolein.

Alcohols act as cocatalysts primarily with those nickel catalysts which are effective in the formation of the dimer 1,5-cyclooctadiene. In general, those nickel catalysts which give excellent yields of 1,5-cyclooctadiene will act as cocatalysts with alcohols to form the linear dimers with good yields, while those nickel catalysts which are selective for the trimer 1,5,9-cyclododecatriene are markedly less effective.

The alcohols which may be used as cocatalysts with the nickel catalyst in this invention to form 1,3,6-octatriene are aliphatic and alicyclic alcohols having three or more carbon atoms. Certain alcohols are more effective than others. Those alcohols which have from three to about eighteen carbon atoms per molecule, with a range of from three to ten carbon atoms per molecule, being preferred. The aliphatic alcohols may be primary, secondary or tertiary alkanols having straight or branched chains which may contain unsaturated carbon-to-carbon linkages. The alcohols listed below in Table I are illustrative.

The yield of 1,3,6-octatriene varies with the concentration of the alcohol. The zerovalent nickel catalyst is used in a concentration of from about 1.5% to about 5% by weight of the diolefinic compound, and the alcohol in a concentration of from about 10% to about 30%. Although the ratio of alcohol and nickel concentration can be varied, the maximum selectivity for 1,3,6-octatriene formation is usually achieved when the weight of the alcohol is about 10 to 25 times the weight of the nickel catalyst.

The yield of 1,3,6-octatriene also varies with temperature. The polymerization reaction may be carried out from about 70° C. to about 160° C. Below 100° C. the reaction proceeds at a slow and uneconomical rate; above 160° C. there is no significant increase in reaction rate; or the rate may be reduced. The preferred range is from about 100° to 130° C.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

Solvents useful in this invention have not been found to be especially critical. Good results are obtained with dicyclopentadiene (dimer of 1,3-cyclopentadiene or 4,7-methylene-2,5-indanediene), alone or mixed with benzene or other solvents such as 1,5-cyclooctadiene. Tetrahydrofuran, toluene, p-cymene, and benzene, alone or in mixture with 1,5-cyclooctadiene, are useful. Others of those suggested herein can be used as the sole solvent. Petroleum ethers, petroleum naphtha, and other hydrocarbon solvents are useful, alone or mixed with other solvents.

If the reagents are not adequately dry, it is beneficial to pretreat with a dehydrating agent, or to incorporate a dehydrating agent in the reaction mixture. Suitable for this is ethylene oxide, calcium carbide, and calcium sulfate.

Oxygen must be excluded from the reaction mixture. This is important; even the small traces of oxygen found in ordinary nitrogen are deleterious.

A polymerization inhibitor such as p-tertiarybutyl catechol may also be added. The maximum p-tertiarybutyl catechol concentration tolerable in the reaction mixture is about 0.2% by weight based on the diolefin starting material. The product ratio decreases when higher concentrations are used. A small amount of polymer is formed when less than 0.05% inhibitor is used.

The time is not critical. The reaction is usually substantially complete within 0.5 to 20 hours. The preferred time is from about 2 to about 6 hours.

When the reaction is complete, the volatile constituents of the reaction mixture are preferably removed by vacuum distillation or steam distillation from polymeric material, calcium salts, and catalyst. The volatile constituents are condensed and the condensate fractionally distilled to recover 1,3,6-octatriene, 2,6-octadiene and 2,4,6-octatriene along with 1,5-cyclooctadiene and 4-vinyl-1-cyclohexene.

The linear dimer formed from 1,3-butadiene according to the process of our invention is predominantly the 1,3,6-octatriene with minor amounts of 2,4,6-octatriene. A significant portion of the 1,3,6-octatriene is reduced by the alcohol to 2,6-octadiene while the alcohol is oxidized to the corresponding ketone.

The invention will be more fully understood by reference to the following illustrative example.

Example

Into a small stainless steel tube equipped with a valve at one end was charged a reaction mixture comprising:

| | Percent by weight |
|---|---|
| Catalyst | 1 |
| Freshly ground calcium carbide | 1–10 |
| p-Xylene | 10 |
| Freshly distilled liquid 1,3-butadiene | remainder |

Oxygen was carefully excluded and anhydrous conditions were used. The reaction mixture was heated at 120° C. for 16 hours by placing the tube in an oil bath equipped with thermostat controls. The products were examined by vapor phase chromatography.

The bis(triphenylphosphite)nickel dicarbonyl used as catalyst was freshly prepared by mixing at room temperature solutions of nickel carbonyl with solutions of triphenylphosphite in the ratio of 1:2 in order to obtain displacement of the two carbonyl groups. Completion of the reaction was denoted by the absence of carbon monoxide evolution, after the reaction mixture had been allowed to stand overnight attached to a gas bubbler.

Table I shows the yields of 1,3,6-octatriene which were obtained using as catalyst bis(triphenylphosphite)nickel dicarbonyl, and a 10% by weight concentration of the alcohol indicated.

TABLE I.—EFFECT OF THE NATURE OF THE ALCOHOL

| Alcohol | Product yield, percent by weight | |
|---|---|---|
| | 1,3,6-octatriene | 1,5-cyclooctadiene |
| n-Propyl | 21 | 3 |
| Isopropyl | 29 | 18 |
| n-Butyl | 20 | 5 |
| Sec. butyl | 21 | 21 |
| tert-Butyl | 26 | 38 |
| Isoamyl | 23 | 9 |
| tert-Amyl | 13 | 37 |
| 2-methylpentanol | 24 | 12 |
| 2,2-dimethylpentanol | 9 | 21 |
| n-Hexyl | 21 | 8 |
| 2-ehtylhexanol | 18 | 18 |
| 2-propyn-1-ol | 23 | 18 |
| Hexadecyl | 10 | 11 |
| 9-octadecene-1-ol | 23 | 18 |
| Cyclohexanol | 29 | 16 |
| Menthol | 11 | 50 |

The structure of the major octatriene product was determined on a simple isolated in a relatively pure state by preparative vapor phase chromatography from a typical crude product made in an alcohol catalyzed run. It was found to be linear by hydrogenation to n-octane, while its mass spectrum showed its molecular weight to be 108 indicating a triene. Infrared spectroscopy showed the presence of a single vinyl group, a cis conjugated internal double bond and a trans internal non-conjugated bond. Nuclear magnetic resonance data showed a methylene group between two double bonds and a methyl group adjacent to a double bond. The accompanying octadiene was shown to be the 2,6-compound. Since this arises from hydrogenation of the octatriene by 1,4 addition to the 1,3 conjugated unsaturation the structure of the triene must be:

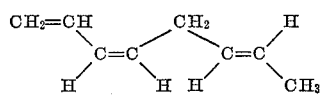

or 1,3-cis, 6-trans-octatriene.

This is a geometric isomer of the 1,3,6-octatriene formed as a minor component from the phenol-cocatalyzed reaction described in copening application S.N. 248,518. From the infrared data the latter compound is the 1,3-trans, 6-cis-octatriene

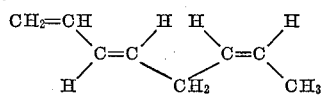

The mass spectra of both compounds were identical in the major peaks though different in their intensities indicating that they are geometric isomers as described. The fact that these compounds give distinctly different retention times on vapor phase chromatographic columns clearly indicates that they are different substances.

The 2,6-octadiene was identified as such by hydrogenation to n-octane. Mass spectroscopy gave a molecular weight of 110. Furthermore, the infrared absorption spectrum showed a strong trans double bond, no vinyl bonds and the presence of methyl groups. Nuclear magnetic rotation data confirmed this, and indicated the absence of a methylene group between two double bonds, and next to a methyl group, as well as the presence of a methylene group next to a double bond.

Another dimer present in minor amount was identified as the conjugated 2,4,6-octatriene. Mass spectroscopy gave a molecular weight of 108 and the infrared absorption spectrum showed no vinyl groups, but exhibited strong trans unsaturation.

Table II below shows the effect of alcohol concentration on the yields of the various products formed, using isopropanol with the catalysts bis(triphenylphosphite) nickel dicarbonyl and bis(triphenylphosphite)nickel diacrylonitrile.

TABLE II.—EFFECT OF CONCENTRATION OF ISOPROPANOL

| Catalyst | Concentration, percent | Alcohol Concentration, percent | Product Distribution,* Percent Yield | | | | | | |
|---|---|---|---|---|---|---|---|---|---|
| | | | 2,6-OD | 1,3,6-OT | 2,4,6-OT | 1,5-COD | VCH | TR | 1,5,9-CDT |
| Bis(triphenylphosphite)nickel dicarbonyl | 1 | 2 | 2 | 16 | 0 | 57 | 29 | 1 | 3 |
| Do | 1 | 5 | 5 | 23 | 2 | 29 | 26 | 2 | 3 |
| Do | 1 | 10 | 9 | 32 | 3 | 16 | 14 | 3 | 3 |
| Do | 1 | 20 | 13 | 37 | 4 | 8 | 17 | 2 | 2 |
| Do | 1 | 30 | 11 | 22 | 3 | 6 | 23 | 0.4 | 1 |
| Do | 4 | 2 | 1 | 7 | 3 | 56 | 24 | 4 | 4 |
| Do | 4 | 5 | 3 | 14 | 4 | 43 | 15 | 5 | 5 |
| Do | 4 | 10 | 6 | 19 | 6 | 29 | 21 | 4 | 2 |
| Do | 4 | 20 | 10 | 26 | 8 | 15 | 18 | 4 | 2 |
| Do | 4 | 30 |   | 21 | 8 | 8 | 16 | 1 | 1 |
| Bis(triphenylphosphite)nickel diacrylonitrile | 1 | 2 | .5 | 6 | 1 | 33 | 26 | 5 | 2 |
| Do | 1 | 5 | 1 | 9 | 3 | 19 | 18 | 4 | 1 |
| Do | 1 | 10 | 1 | 19 | 3 | 16 | 25 | 5 | 1 |
| Do | 1 | 20 | 4 | 23 | 3 | 11 | 19 | 4 | 2 |
| Do | 1 | 30 | 2 | 12 | 3 | 6 | 26 | 3 | 1 |

*OD=Octadiene; COD=Cyclooctadiene; TR=Trimer; OT=Octatriene; VCH=4-vinyl-1-cyclohexene; CDT=Cyclodecatriene.

From Table II it is observed that the maximum yields of 1,3,6-octariene are obtained when the weight of the alcohol is about one-fifth the weight of the butadiene charged.

Table III shows the effect of isopropanol on the specificity and selectivity of various catalysts in the concentration indicated. The isopropanol is used at a concentration of 20% of weight of the 1,3-butadiene.

TABLE III.—EFFECT OF NATURE OF CATALYST

| Catalyst | Catalyst Conc., percent | Product Distribution | | |
|---|---|---|---|---|
| | | 2,6-OD | 2,4,6-OT | 1,3,6-OT |
| (1) ($\varphi O_3$)PNi(CO)$_3$ | 9.9 | 16 | 6 | 21 |
| (2) [($\varphi O_3$)P]$_2$Ni(CO)$_2$ | 1 | 13 | 4 | 37 |
| (3) ($\varphi_3$P)$_2$Ni(CO)$_2$ | 2.1 | 19 | 3 | 23 |
| (4) (n-C$_4$H$_9$)$_3$PNi(CO)$_3$ | 2.1 | 28 | 3 | 20 |
| (5) [(n-C$_4$H$_9$)$_3$P]$_2$Ni(CO)$_2$ | 2.1 | 22 | 8 | 35 |
| (6) ($\varphi_3$As)$_2$Ni(CO)$_2$ | 2.2 | 22 | 1 | 27 |
| (7) ($\varphi_3$Sb)$_2$Ni(CO)$_2$ | 3.5 | 3 | 3 | 32 |
| (8) [($\varphi O$)$_3$P]$_2$Ni diacrolein | 2 | 4 | 5 | 12 |
| (9) "Phos" Ni diacrolein | 2 | 11 | 1 | 11 |
| (10) [($\varphi O$)$_3$P]$_2$Ni diacrylonitrile | 1 | 4 | 3 | 23 |
| (11) ($\varphi_3$P)$_2$Ni dicinnamonitrile | 2.3 | 9 | 5 | 10 |

OD=Octadiene; OT=Octatriene.

The following nickel carbonyl (Reed catalysts) having the corresponding compound numbers in Table III (1) Triphenylphosphite nickel tricarbonyl
(2) Bis(triphenylphosphite) nickel dicarbonyl
(3) Bis(triphenylphosphine) nickel dicarbonyl
(4) Tri(n-butyl)phosphine nickel tricarbonyl
(5) Bis[tri(n-butyl)phosphine] nickel dicarbonyl
(6) Bis(triphenylarsine) nickel dicarbonyl
(7) Bis(triphenylstibine) nickel dicarbonyl were prepared in a known manner by mixing at room temperature solutions of nickel carbonyl with solutions of the ligand in the ratio of 1:1 or 1:2 in order to obtain displacement of one or two carbon monoxide groups. Completion of the reaction was denoted by the absence of carbon monoxide evolution, after the reaction mixture had been allowed to stand overnight attached to a gas bubbler. The solvent was removed in a rotating evaporator to give the product in quantitative yields.

Bis(triphenylphosphite) nickel diacrolein (compound 8) was prepared by adding 0.25 g. of solid nickel diacrolein to a solution of 2.4 g. of triphenylphosphite in 50 cc. of ether, and refluxing for 8 to 20 hours. The violet color of the solid changed to grey. The grey crystals were filtered and washed with ether. They decomposed at about 140° C.

The nickel diacrolein was prepared in a known manner by refluxing nickel carbonyl with acrolein for several hours in an anhydrous solvent, or in a large volume of the acrolein.

"Phos" nickel diacrolein (compound 9) was prepared by refluxing 1.1 g. of nickel diacrolein in a solution of 0.96 g. of "phos" in 50 cc. of ether for 4–5 hours. The deep violet color of nickel diacrolein changes to green. The green solid is filtered and washed with ether. The "phos," which is 1-methyl-4-phospha-3,5,8-trioxabicyclo [2,2,2] octane, was prepared in a known manner by adding the following solutions simultaneously to 340 ml. of tetrahydrofuran with rapid stirring (nitrogen atmosphere).

Solution 1: 36 g. of 1,1,1-trimethylolethane dissolved in 100 ml. of anhydrous pyridine and diluted to 225 ml. with tetrohydrofuran.

Solution 2: 26.4 ml. of PCl$_3$ diluted to 225 ml. with tetrahydrofuran.

The pyridinium hydrochloride is allowed to settle before the mixture is filtered. The solvent is distilled from the solution in vacuo until the residue is a thick syrupy mass from which the product is removed by sublimation in vacuo. The product is recrystallized from hot heptane.

Bis(triphenylphosphite) nickel diacrylonitrile (Compound 10) was prepared by adding 2.0 g. of solid nickel diacrylonitrile to a solution of 23.7 g. of triphenylphosphite in 50 cc. of ether and refluxing for 3–8 hours. The red solid changed slowly to straw yellow and finally to a white solid. This was filtered and reprecipitated by the addition of hexane to an ether solution in which it was slightly soluble. The product decomposed at 100° C.

The nickel diacrylonitrile was prepared in a known manner by refluxing nickel carbonyl with acrylonitrile for several hours in an anhydrous solvent, or in a large volume of the acrylonitrile.

Bis(triphenylphosphine) nickel dicinnamonitrile (Compound 11) was prepared by refluxing 0.67 g. of solid nickel dicinnamonitrile in a solution of 2.5 g. of triphenylphosphine in 50 cc. of ether for 6 hours. The violet color of nickel dicinnamonitrile changed to yellow. The yellow compound was filtered, washed with hexane, dried and stored under nitrogen. The nickel dicinnamonitrile was prepared in a known manner by refluxing nickel carbonyl with cinnamonitrile for several hours in an anhydrous solvent.

While particular embodiments of this invention are shown above, it will be understood that the invention is obviously subject to variations and modifications without departing from its broader aspects.

What is claimed is:

1. A process for the production of linear dimers of open chain conjugated diolefin which comprises polymerizing an open chain conjugated diolefin at a temperature within the range of 70° C. to 160° C. in contact with a zerovalent nickel catalyst derived from nickel carbonyl, and a cocatalyst selected from the group consisting of aliphatic and alicyclic alcohols having more than two carbon atom, said nickel catalyst being present in an amount equal to 0.5% to 5% by weight of said diolefin, and said alcohol co-catalyst being present in an amount equal to about 10% to 30% by weight of said diolefin.

2. The process of claim 1 wherein said conjugated diolefin is 1,3-butadiene and said linear dimers are 1,3,6-octatriene and 2,4,6-octatriene.

3. The process of claim 1 wherein said nickel catalyst has the formula [RO$_3$P]nNi(CO)$_{4-n}$, wherein R is an organic radical selected from the group consisting of alkyl, aryl and heterocyclic and n has a value of from 1 to 2.

4. The process of claim 3 wherein said nickel catalyst is bis(triphenylphosphine) nickel dicarbonyl.

5. The process of claim 3 wherein said nickel catalyst is bis[tri(n-butyl)phosphine] nickel dicarbonyl.

6. The process of claim 1 wherein said nickel catalyst has the formula $(R_3OP)_nNi(CO)_{4-n}$, wherein R is an organic radical selected from the group consisting of alkyl, aryl and heterocyclic, and $n$ has a value of from 1 to 2.

7. The process of claim 6 wherein said nickel catalyst is bis(triphenylstibine) nickel dicarbonyl.

8. The process of claim 1 wherein said nickel catalyst is characterized by the formula: $A_{1,2}$-Ni-$B_2$ wherein A is selected from the group consisting of triphenyl phosphine, triphenyl phosphite, and 1-methyl-4-phospha-3,5,8-trioxa-bicyclo[2,2,2]octane and B is selected from the group consisting of cinnamonitrile, acrylonitrile, fumaronitrile and acrolein.

9. The process of claim 8 wherein said nickel catalyst is bis(triphenlphosphite) nickel diacrylonitrile.

10. The process of claim 1 wherein said alcohol is selected from the group consisting of aliphatic and alicyclic alcohols having from 3 to about 18 carbon atoms.

11. The process of claim 10 wherein said alcohol is isopropanol.

12. The process of claim 10 wherein said alcohol is cyclohexanol.

13. The process of claim 10 wherein said alcohol is tertiary butanol.

14. A process for the preparation of 1,3,6-octatriene which comprises polymerizing 1,3-butadiene in the presence of from 0.5% to about 5% of bis(triphenylphosphite) nickel dicarbonyl catalyst and from about 10% to about 30% by weight of isopropanol cocatalyst at a temperature within the range of 70° C. to 160° C., and then separating the 1,3,6-octatriene from the resulting product mixture by fractional distillation and thermal diffusion.

15. A process for the preparation of 2,6-octadiene which comprises polymerizing 1,3-butadiene in the presence of from 0.5% to about 5% of bis-triphenylphosphite) nickel dicarbonyl catalyst and from about 10% to about 30% by weight of isopropanol co-catalyst at a temperature within the range of 70° to 160° C., and then separating the 2,6-octadiene from the resulting product mixture by fractional distillation.

16. A process for the preparation of 2,4,6-octatriene which comprises polymerizing 1,3-butadiene in the presence of from 0.5% to about 5% of bis(triphenylphosphite) nickel dicarbonyl catalyst and from about 10% to about 30% by weight of isopropanol co-catalyst at a temperature within the range of 70° to 160° C., and then separating the 2,4,6-octatriene from the resulting product mixture by fractional distillation.

17. In a process for the production of open-chain dimers of open-chain 1,3-dienes by catalytic dimerization of said 1,3-dienes in the presence of catalysts containing zero-valent nickel and a member selected from the group consisting of compounds of trivalent phosphorus, arsenic and antimony, the improvement which comprises carrying out the reaction in contact with an organic hydroxyl compound which bears the hydroxzyl group attached to an aliphatic or cycloaliphatic carbon atom of a saturated hydrocarbon structure in at least a molar quantity with reference to nickel.

18. An improved process as claimed in claim 1 wherein the non-aromatic organic hydroxyl compound is a member selected from the group consisting of aliphatic and cycloaliphatic alcohols having three to fifteen carbon atoms and having apart from the hydroxyl group, saturated hydrocarbon structure.

19. An improved process as claimed in claim 1 wherein the said non-aromatic organic hydroxyl compound is used as a solvent.

20. An improved process as claimed in claim 1 which the 1,3-diene is butadiene.

21. An improved process as claimed in claim 1 carried out in contact with a polymeriation inhibitor.

22. An improved process as claimed in claim 1 carried out at a temperature between 70° and 160° C.

23. An improved process as claimed in claim 1 carried out at a temperature between 70° and 150° C.

References Cited

UNITED STATES PATENTS

| 2,504,016 | 4/1950 | Foster | 260—666 |
| 3,277,099 | 10/1966 | Saibt et al. | 260—666 |

FOREIGN PATENTS

| 1,295,072 | 4/1962 | France. |
| 1,300,595 | 6/1962 | France. |
| 1,140,569 | 12/1962 | Germany. |

DELBERT E. GANTZ, Primary Examiner.

V. O'KEEFE, Assistant Examiner.

U.S. Cl. X.R.

260—666, 680